Figure 1:
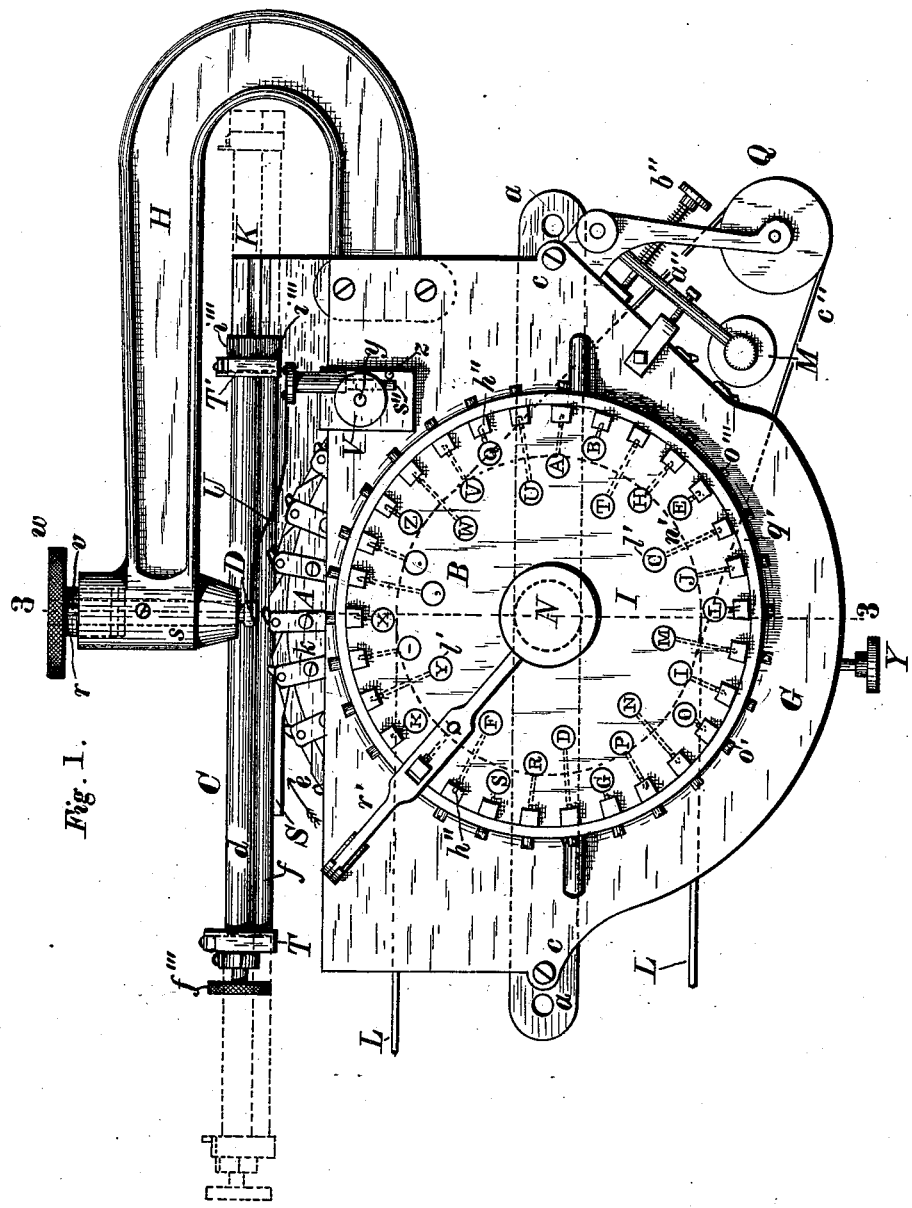

(No Model.)

G. B. SELDEN.
TYPE WRITING MACHINE.

No. 557,239.  Patented Mar. 31, 1896.

Witnesses
H. G. Phillips.
A. Sorge Jr.

Inventor
Geo. B. Selden

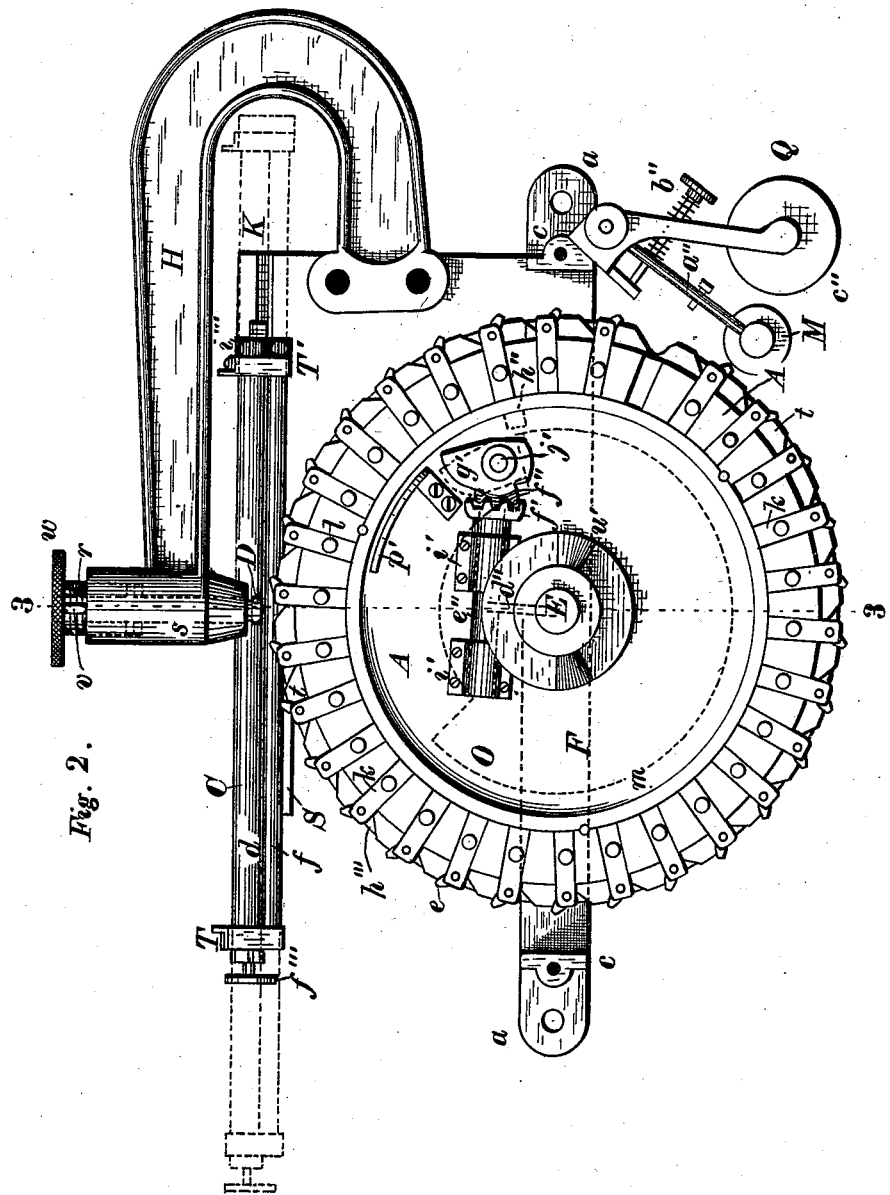

(No Model.) 5 Sheets—Sheet 3.
G. B. SELDEN.
TYPE WRITING MACHINE.
No. 557,239. Patented Mar. 31, 1896.
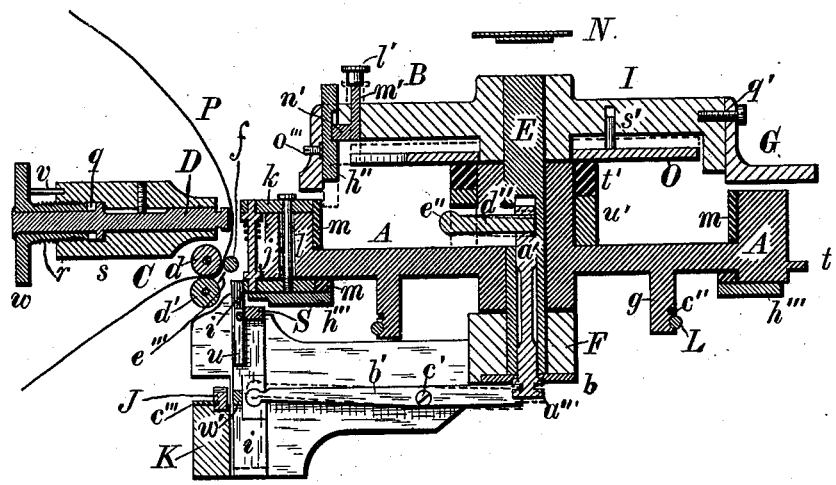
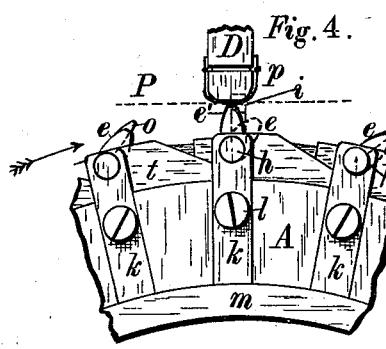
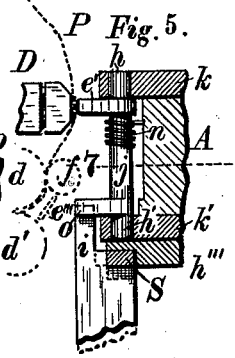
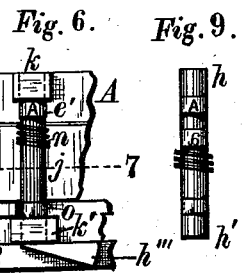
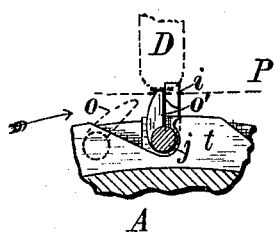
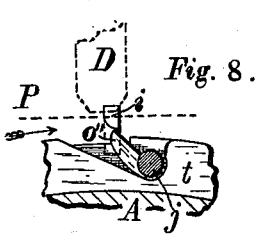
Witnesses
H. G. Phillips.
A. Sorge Jr.
Inventor
Geo. B. Selden (No Model.)  G. B. SELDEN.  5 Sheets—Sheet 4.
TYPE WRITING MACHINE.
No. 557,239.  Patented Mar. 31, 1896.
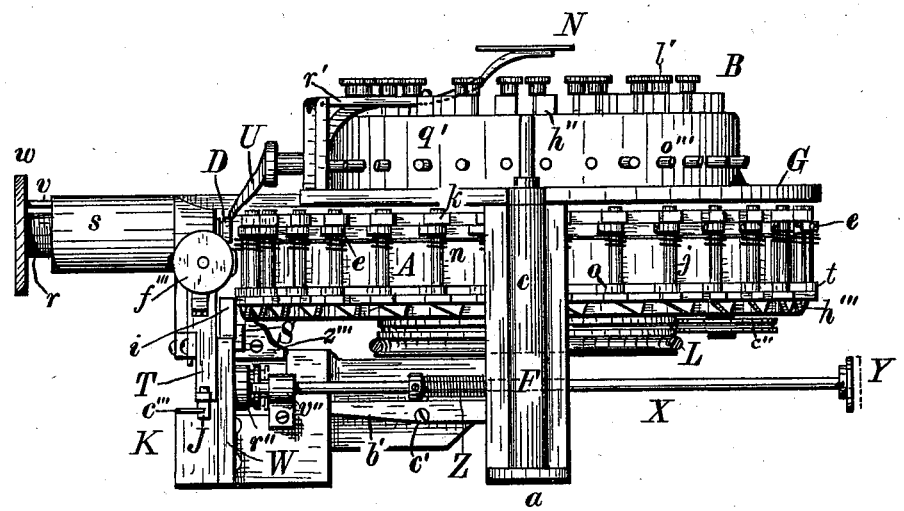
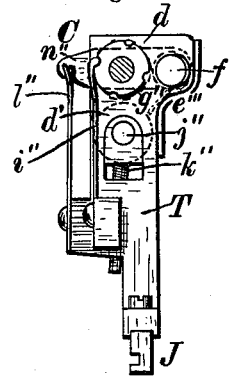
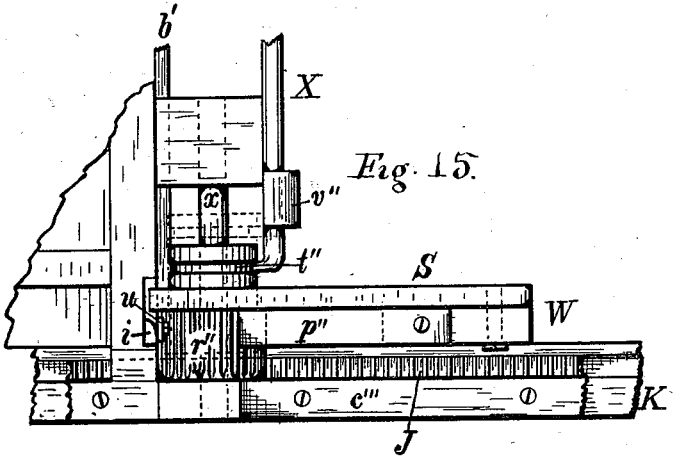
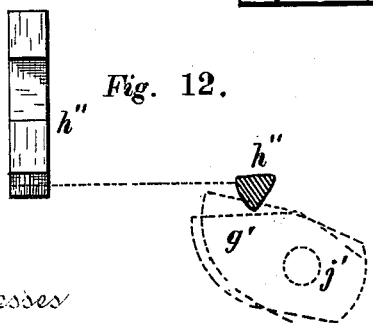
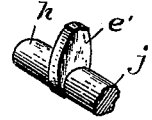
Witnesses
H G Phinps
A Sorgs Jr
Inventor
Geo. B. Selden (No Model.) 5 Sheets—Sheet 5.

G. B. SELDEN.
TYPE WRITING MACHINE.

No. 557,239. Patented Mar. 31, 1896.

Witnesses
H. G. Phillips
A. Sorge Jr.

Inventor
Geo. B. Selden

UNITED STATES PATENT OFFICE.

GEORGE B. SELDEN, OF ROCHESTER, NEW YORK, ASSIGNOR TO SCHLICHT & FIELD CO., OF SAME PLACE.

TYPE-WRITING MACHINE.

SPECIFICATION forming part of Letters Patent No. 557,239, dated March 31, 1896.

Application filed June 24, 1887. Serial No. 242,358. (No model.)

*To all whom it may concern:*

Be it known that I, GEORGE B. SELDEN, of Rochester, Monroe county, New York, have invented certain new and useful Improvements in Type-Writing Machines, of which the following is a specification.

The object of this invention is to provide a machine for printing or impressing characters, the characters being selected by means of key-actuated devices and the work of impressing the characters effected by mechanism which operates the type or impression devices automatically after the same have been selected by means of the keys. For the purpose of supporting the material there is provided a platen, which is set facing the axis of the type or impression device orbit, so that when the impression device—this having normally a continuous orbital movement—is given a rotative working stroke upon its own axis during its said orbital movement, and said working stroke is inaugurated at the proper point in said orbital movement, the face of the type or impression device will have imparted thereto a hypercycloidal movement, bringing it fairly against said platen or against material supported upon said platen, and the impression device will, during its working stroke, be brought to its working position by a rotative movement in a direction opposite to its rotation in its orbit, and during its said working stroke will be brought into alinement with the two axes of its rotative movements. The type or impression device, therefore, while making its working stroke, starts from an inoperative position relatively to its own axis and said platen and rotates in a direction opposite to the turret or carrier on which the said device is pivotally supported or journaled, and when said device approaches the material it operates after the manner of the so-called "toggle-joint," and also by a rolling action upon such material, thereby effecting the impression in the smoothest and best manner and with a relatively great pressure by a peculiar rolling action requiring a relatively small amount of power.

Figure 13:
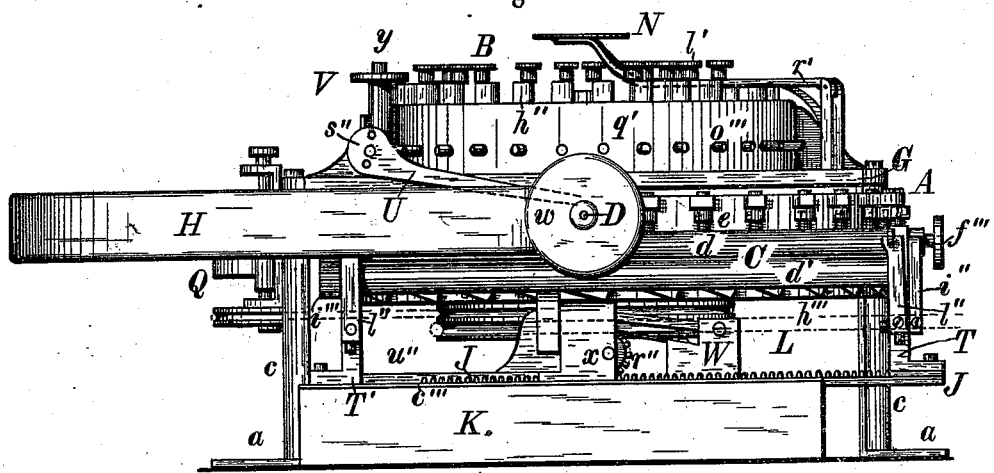
Figure 14:
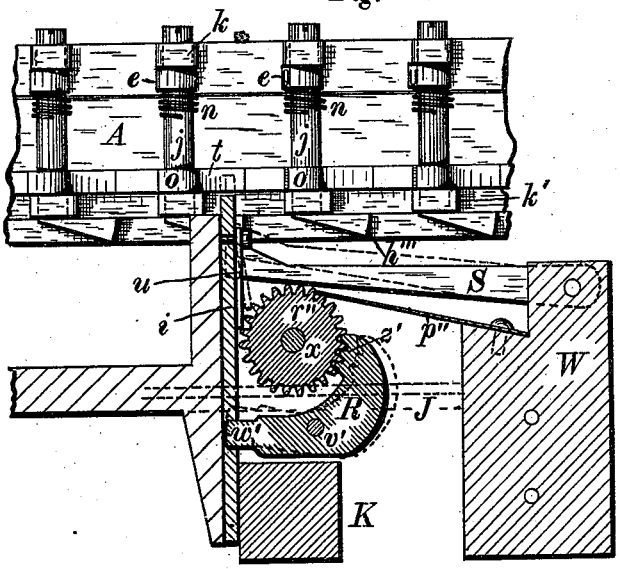

In the accompanying drawings, representing my improved type-writer, Figure 1 is a plan view. Fig. 2 is a plan view, the keyboard being removed. Fig. 3 is a vertical section on the line 3 3, Figs. 1 and 2. Fig. 4 is a plan view of a portion of the revolving type-wheel, showing the action of the pivoted type or impression devices. Fig. 5 is a radial section of the rim of the type-wheel, showing one of the pivoted type or impression devices in the position it occupies when printing. Fig. 6 is an elevation of a portion of the rim of the type-wheel, showing one of the pivoted type or impression devices extending radially outward as when printing. Fig. 7 is a section on the line 7 7, Figs. 5 and 6, showing the parts below that line. Fig. 8 is a sectional view on the same line as Fig. 7, showing the actuating-arm escaping from the detent after the printing operation has been completed. Fig. 9 represents a modification of the printing devices, showing double type or impression devices. Fig. 10 is a side elevation of the machine as seen from the left hand in Fig. 1. Fig. 11 is an end elevation of the paper-carriage detached. Fig. 12 represents one of the plungers detached as seen from its inner side. Fig. 13 is a rear elevation of the machine. Fig. 14 is a rear elevation, partially in section, showing the construction and operation of the feeding mechanism. Fig. 15 is a partial plan view of the feed mechanism. Fig. 16 is a view on an enlarged scale of one of the type or impression devices.

A represents the revolving type wheel or carrier; B, the keyboard; C, the paper-carriage, and D the platen. The type-carrier is provided with the shaft E, which revolves in suitable journals in the frame of the machine, the construction of which is such as to sustain the type-carrier while revolving in a horizontal or nearly horizontal plane and to support the keyboard in front of the paper and paper-carriage and the platen behind the paper, while at the same time permitting the lateral movement of the paper and its carriage. This arrangement brings the printing directly in front of the operator and enables him to read the printing as fast as it is done without removing the hands from the keyboard or making any movement whatever, an almost indispensable feature of machines of this class.

In the particular form of machine represented in the accompanying drawings the keyboard B is placed immediately over the typewheel, which arrangement is desirable, as it brings the operator's hands as near the printing as possible, although any other preferred construction may be adopted.

The framework of my improved type-writer consists of a suitable base plate or bar F, Figs. 3 and 10, an upper plate G and an arm H, which supports the platen D and is attached to one or both of the plates F and G. The plate F is provided with lugs or feet a a, Fig. 1, by which the machine is secured to a table or other support, and uprights or standards c c, by which the two plates are connected together. The lower end of the shaft E of the type-wheel is journaled in the lower bar or plate F, its extremity resting on a step b, Fig. 3, if desired. The upper end of the shaft E revolves in the upper part of the frame, or, in the construction of the keyboard shown in the drawings, in the plate I sustained by the top plate G. The arm H, which connects the platen D with the frame in which the typewheel revolves and sustains it in position to receive the thrust of the pivoted type e e, is extended around behind the path traversed by the paper in its movement.

The paper-carriage consists essentially of the rollers $d\ d'\ f$, between which the paper P passes, as indicated in Fig. 3, so that it is presented to the type between the platen and the type-wheel. The rollers of the paper-carriage are connected to and supported by the sliding bar J, which travels in a groove or other suitable support on the extension piece or arm K, which is attached to the framework of the machine. The movement of the paper-carriage is indicated by the dotted lines in Fig. 1.

Power is applied to rotate the type-wheel A continuously in one direction, as indicated by the arrows on the drawings, in any suitable or preferred manner—as, for instance, by a belt L, Figs. 1 and 3, passing around a pulley $g$.

The printing of the letters in any desired succession on the paper in response to the touches of the operator's fingers on the keyboard is accomplished by the pivoted type $e$, which are caused to swing outward from the type-wheel in a plane parallel with that in which the wheel revolves, so as to make the impressions on the paper by means of the detent or arresting device $i$.

The operation of the printing device will be readily understood from an inspection of Figs. 4 to 8, inclusive. Around the rim of the type-wheel are placed a series of pivoted type $e$, having their outer ends cut or otherwise shaped so as to represent the letters of the alphabet and such other characters as may be desired. The printing device consists essentially of an arm having a character at its outer end and connected to an actuating-arm $o$ by the stem or body $j$. The type or printing device is pivoted to the type-wheel in any suitable or preferred manner, so that its free end may swing radially outward in the plane of revolution to impress the character on the paper supported by the platen, as will be understood from Fig. 4.

In the particular form of construction shown in the drawings the type are provided on their ends with the journals $h\ h'$, Fig. 5, which are fitted to openings in the bars $k\ k'$, the outer ends of which project slightly beyond the edge of the type-wheel. The bars $k\ k'$ are secured to the type-wheel in any suitable manner—as, for instance, by the screws $l$ passing through the type-wheel and serving to hold the bars thereon. The openings in the wheel through which the screws $l$ pass are slightly enlarged or elongated, so as to permit a radial adjustment of the bars $k\ k'$ in order that the type may be individually adjusted to and from the center of the wheel. The adjustment required is very slight, and the space for this purpose is indicated by the dark lines in Fig. 3 at the sides of the screws $l$. In the drawings the type-wheel is shown as provided with radial slots, into which the bars $k\ k'$ are fitted. The rim of the type-wheel is in this construction made of a depth corresponding with the length of the stem $j$ of the pivoted characters, and an inner ring or rings $m\ m$, Fig. 3, is fitted to the type-wheel, against which the inner ends of the bars $k\ k'$ abut. This arrangement facilitates the operation of milling the slots for the bars $k\ k'$. Any other means of attaching the characters to the type-wheel, so that they can swing radially outward, may, however, be adopted.

The position occupied by the type when not printing is represented at $e$ in Fig. 4. The faces of the characters while revolving with the wheel receive ink from the inking-roller M, Fig. 1. The position of the characters when printing is represented at $e'$, Fig. 4, the face end of the character being in contact with the paper P and pressing it against the platen D. It will be observed that while the type-wheel travels in one direction, from left to right, as indicated in Fig. 4, for instance, the type or printing device itself swings in an opposite direction during the printing operation. The type or printing character is caused to swing to produce the impressions by the detent or trip device $i$, which is interposed in the path of the actuating or trip arm $o$. The operation is indicated in Figs. 7 and 8. The trip-arm $o$, occupying the position represented at $o$, Fig. 7, comes in contact with the detent or trip device $i$, and arrests its movement of revolution with the type-wheel, causing the trip-arm, stem $j$, and character $e$ to turn about their pivotal axis, the result of the two movements of the type-wheel and the character being that the face of the latter is pressed against the paper without moving laterally, so that a clean and sharp impression is produced.

It will be observed that in order to hold the face of the type practically at rest, so far as the lateral movement of the type-wheel is concerned, the acting face of the detent or type-revolving device should be placed at a distance from the axis about which the type revolves equal to the length of the arm provided with the character. The action is like that of two gears secured on the same axis meshing with a rack—the gears must be of the same diameter on the pitch-line. The position of the trip-arm when the device is printing is shown at $o'$, Fig. 7. The acting face of the trip-arm $o$ and the detent $i$ are given any suitable form similar to that employed for gear-teeth adapted to produce the desired result of forming a clean impression on the paper, or, as indicated in the drawings, the face of the trip-arm may be radial, while the detent is rounded or given a tooth-like shape for the same purpose. After the impression has been made, the revolution of the character on its own axis is continued by the detent or trip device $i$, so that the face of the type is withdrawn from the paper by the continued swinging movement of the type, the positions of the parts at or near the completion of the swinging movement of the character being indicated at $o''$, Fig. 8. The face of the type is thus caused to protrude from the type-wheel, press against the paper while at rest or without lateral movement, and to withdraw from the paper by simply swinging about its own axis while said axis is traveling onward continuously with the revolution of the type-wheel. The force of the impression is also very great, as the type-wheel and character form practically a toggle-joint. The machine can therefore be used with very great advantage for producing a large number of manifold copies. The face of the character is preferably turned up concentric with its pivotal axis, or, in order to prevent the sides of the type representing wide letters from printing too hard, the face of the platen D is rounded. The face of the platen may be made of or covered with leather, rubber, or other elastic substance, as indicated at $p$, Fig. 4, or an elastic collar or cushion may be introduced between the platen and its adjusting-screw, as shown at $q$, Fig. 3.

The stems $j$ of the pivoted type are provided with the springs $n$, by which they are returned to their usual position after the printing operation is performed.

When the springs $n$ are used to return the type, the wheel should be provided with suitable stops to arrest the movement when they return to their normal position, and these stops are conveniently formed by cutting notches in the flange $t$, as represented in the drawings.

Provision should be made in some suitable manner for the relative adjustment of the face of the platen and the axis of the type-wheel, so as to enable the machine to print with the requisite amount of force on different thicknesses of paper or in producing varying numbers of manifold copies. It is simpler to adjust the platen than the type-wheel, and I therefore employ a screw $r$, Fig. 3, for this purpose. The platen passes through an opening formed for it in the boss $s$ on the arm H or extension of the frame and bears against the adjusting-screw $r$, by turning which in one direction or the other, the face of the platen is caused to advance toward or recede from the axis of the type-wheel. The platen is prevented from turning in the boss by a screw, pin, or other suitable device. A stop $v$ is employed to prevent the platen from being moved too far inward toward the type-wheel. This stop may be arranged either to act on the screw $r$ or its thumb-nut $w$, or on the platen D itself.

Any suitable number or style of characters may be employed.

The detent $i$ is operated from the keyboard, so as to cause the character corresponding to the key touched to print itself on the paper, in the following manner: The detent is arranged to slide up and down in a suitable guide or way on the base-plate or frame of the machine, as indicated by the full and dotted lines in Figs. 3 and 5, and it receives this motion from the sliding rod $a'$ in the hollow shaft E by the lever $b'$, which is pivoted at $c'$ to the frame. The sliding rod $a'$ is connected by the arm $d''$ with the rock-shaft $e''$, which receives motion from the tappet $g'$ by means of the bevel-gears $f' f''$, and these parts constitute the stop or detent actuator. The tappet $g'$ revolves with the type-wheel, and is caused to swing inward, as indicated by the full and dotted lines in Fig. 2, whenever one of the plungers $h''$, Figs. 1 and 3, is pressed downward into its path, by a touch on one of the finger-keys $l'$, which movement is transmitted to the detent by the gears $f' f''$, rock-shaft $e'$, sliding rod $a'$, and lever $b'$. At its lower end the sliding rod $a'$ is provided with a grooved head $a'''$ or collar, which engages with a notch or projection on the end of the lever $b'$, so as to maintain an operative connection between the two while the rod revolves with the type-wheel. Any suitable form of joint may be used for this purpose. The detent and its actuating parts connected therewith are returned to their position after a printing operation by the ring of cams $h'''$, Figs. 3, 6, and 10. A spring may, however, be employed for this purpose. The rock-shaft $e''$ is attached to the type-wheel by suitable journal-boxes $i' i'$, Fig. 2. The arm $d''$ passes through a slot in the hub of the type-wheel and the shaft E, its inner end being fitted to a mortise or otherwise jointed to the sliding rod $a'$, so as to transmit motion to it. The segmental bevel-gear $f'$ is secured on the end of the rock-shaft $e''$ and meshes with a corresponding segmental bevel $f''$, arranged to turn on a stud $j'$ inserted in the web of the type-wheel. The tappet $g'$ is fastened to the bevel $f''$, so as to revolve therewith.

The lower ends of the plungers $h''$ normally occupy a position just above the path described by the tappet $g'$ as it revolves; but when pressed downward by the finger-keys $l'$ the lower ends of the plungers are intruded into the path of the tappet, which is compelled to swing inward a short distance as it passes the plungers, and this movement, through the mechanism described, is transmitted to the detent to raise it up to produce the swinging movement of the type by which the printing is effected. The arrangement of the parts is such that when the tappet is passing the plunger used for any given letter the type bearing such letter is just approaching the detent. The plungers $h''$ are connected with the finger-keys $l'$ by the rods $m'$ and arms $n'$, Fig. 3, the outer ends of the arms projecting into notches in the plungers, which permit the finger-keys to be raised upward or returned after being struck without raising the plungers, which are returned by the inclined plane or cam $p'$, Fig. 2, attached to the type-wheel.

The plungers are arranged to slide in slots in the edge of the disk I, which is inserted in a ring $q'$ on the top plate G. A slight amount of friction is produced on the plungers (just sufficient to prevent their falling by their own weight) in any suitable manner—as, for instance, by a disk of leather or other suitable material pressed against the plungers by the screws $o'''$, inserted in the ring $q'$. The shape of the plungers is shown in Fig. 12, which is an elevation of one of them as seen from the inside, and also a transverse section through its lower end. The disk I is secured in place in the ring by screws or pins or in any other suitable manner. The arms $n'$ project outward through slots in the disk. The upper ends of the rods $m'$ are provided with any suitable finger-keys marked to correspond with the type or characters on the wheel.

Between each impression the paper-carriage is moved toward the left hand the width of the letters by mechanism described hereinafter.

N is the space-key, one of the type being omitted. For convenience it is placed in the center of the keyboard and connected to its plunger by the lever $r'$. A spring is employed to keep it in the raised position.

For a letter-by-letter machine—that is, a machine which prints only one letter at a revolution—the above described parts constitute a simple and efficient arrangement of the keyboard; but to allow the printing of combinations of two or more letters each revolution in their proper order it is necessary to apply to the keyboard a device which will insure the printing of the letters struck at any one touch in the correct relative positions. Thus in the arrangement just described suppose it were desired to print the letters "T H E" and that in striking the corresponding keys the tappet $g'$ had, in revolving, passed beyond the plunger corresponding to the key "T," then the letters would be printed in the order "H E T." In order to prevent such an occurrence, the keys "T" "H" "E" should be locked so that they cannot be struck while the tappet is passing by the corresponding plungers. Then if all these keys "T" "H" "E" be struck the letters will invariably be printed in their proper order. In order to secure this result, I employ the locking-plate O, Figs. 2 and 3, which is moved up by a cam on the type-wheel or its shaft, as represented by the full and dotted lines in Fig. 3, and I divide the characters on the keyboard into two sets, one of which is printing while the other is being struck, and vice versa.

A suitable arrangement of the characters where the minimum number of keys is employed is represented in Fig. 1, in which those nearest the operator, commencing at "Q" and ending with "F," are controlled by the locking-plate O. The locking-plate is given such a form, as indicated by the dotted lines in Fig. 2, as to come in contact, when raised up, with the lower ends of the rods $m'$, so as to prevent the keys corresponding to the letters from "Q" to "F" being struck while the tappet is performing this part of its revolution. These letters can be struck while the tappet is passing from "F" to "Q." The consequence is that if any two or more of these letters are struck in combination they will all be printed in the proper order.

The keys may be arranged in any preferred relation to each other, so as to facilitate the printing of combinations of letters, thus securing much greater speed than can be obtained in a letter-by-letter machine. The locking-plate O is provided with one or more pins or guides $s'$, Fig. 3, which serve to steady it in its up-and-down motion. The plate is provided with a cam-collar $t'$, which, acting against the cam $u'$ attached to or on the hub of the type-wheel, serves to give the locking-plate the requisite movement. The shape of the cam-surfaces of $t'$ and $u'$ is, as shown in Figs. 2 and 3, such that the plate is raised so as to prevent the keys "Q" to "F" being struck while the tappet is traveling from "Q" to "F;" but the plate is allowed to drop down, so as to permit these keys to be struck when the tappet is passing on the side of the keyboard away from the operator from "F" to "Q." The keys on this side of the keyboard, being those which are used the least frequently, need not be provided with a locking-plate, at least in machines having a minimum number of characters. By adopting a suitable relative arrangement of the characters on the keyboard and by duplicating some of the more commonly-occurring letters, especially the vowels, an average of four or five letters can be printed on each revolution of the type-wheel. The duplication of the vowels increases largely the number of possible combinations. Thus, for instance, if "E" is placed both before and after the principal consonants it enables the operator to print at one touch combinations of characters in which "e b, e c, e d," &c., occur, as well as combinations containing "b e, c e, d e," &c.

My invention contemplates, as shown in Fig. 9, the application of two or more printing-faces to the stem *j*, so that both upper and lower case letters may be used.

The relative arrangement of the letters on the type-wheel must correspond with that adopted for the keyboard, the letters being so placed on the type-wheel that when the tappet is passing the plunger corresponding to any given character the proper type is approaching the stop or detent.

While the construction of the keyboard and of the connecting devices by which the rotation of the printing-type is secured, as herein described and shown, has proved satisfactory in practical use, it is obvious that many other different arrangements of mechanism for this purpose may be adopted and employed in connection with the printing devices herein described, and the printing devices themselves may be variously modified without departing from the principle of this part of my invention, which consists in effecting the printing by a rolling action and with great force with a continuously-revolving type-wheel by means of the pivoted type which swing outward against the paper, while their printing-faces remain practically at rest at the time of the impression.

In Fig. 9 I have represented a pivoted type as provided with two characters, either of which may be brought into action by any suitable arrangement of the machine.

M is the inking-roller by which ink is applied to the faces of the pivoted type as they revolve with the type-wheel. It is supported in any suitable manner, as by means of the pivoted arm $a''$, and held up to the type by the spring $b''$.

Q is a roller by which the ink is distributed on the composition roller M, which is driven from the type-wheel by the belt $c''$ or other suitable device. The roller Q may be arranged to run in contact with the roller M, or, as shown in the drawings, the roller M may be swung outward, so as to come in contact with Q whenever a fresh supply of ink is required. Lithographic transfer-ink may be used on the machine, the printing being transferred to stone, as ordinarily practiced in such work.

The bars $k\ k'$ may be adjusted by introducing packing between their inner ends and the ring $m$, so that in case any of the type become worn from use they may be set out to the proper distance for printing.

It is obvious that any suitable paper-feeding mechanism may be used in connection with my invention, as hereinbefore described; but I have found that the following arrangement answers well in practice and possesses the merit of durability and certainty: The paper is held between the rollers $d\ d'\ f$, as indicated in the sectional view, Fig. 3. It will be observed that the paper is bent outward from the type-wheel to leave room for the swinging of the actuating-arms $o$. The rollers of the paper-carriage are placed below the platen, as if placed above they would not only prevent the reading of some of the printed matter, but would also become soiled with the ink and transfer it to the paper. They should also be located as near the platen or point where the printing is done as conveniently may be. The line-feed is performed by turning the roller $d$ so as to feed the paper upward the requisite distance for the width between the lines by means of the milled wheel $f'''$, a notched collar $g''$, and spring $i''$, Fig. 11, being placed on the axis of the roller to hold it in proper position during the printing of a line. The rollers $d\ d'\ f$ are geared together at one end of the paper-carriage, as indicated at $i'''$, Fig. 2.

The shaft $j''$ of the roller $d'$ is mounted in movable boxes in the standards T T', being pressed up against the roller $d$ by the springs $k''$ at each end. The roller $f$ is drawn against the roller $d$ by the springs $l''\ l''$, the upper ends of which are connected with $f$ by the links $n''$ passing along the sides of the standards T T'. These links are slotted to permit the shaft, as indicated by dotted lines in Fig. 11, of roller $d$ to pass through them. It will be observed that the paper is securely held when passed in between these rollers. To prevent any oil or dirt from the detent or type-actuating arms from coming in contact with the paper or rollers, I employ a guard located between these parts, and which may be either stationary and attached to the frame of the machine in any convenient way or movable and carried by the paper-carriage itself. In the latter case it may be either located between the rolls $d'$ and $f$, as indicated at $e'''$, Fig. 3, or it may be arranged to protect both the paper and the rollers, as indicated at $e'''$, Fig. 11. In these cases the guard is attached to the standards of the paper-carriage and extends the whole distance between them.

The standards T T' are attached at their lower ends to the rack-bar J, which slides in a guideway or groove in the support K. The bar is held in the guideway by any suitable gib or clip—as, for instance, by the plate $c'''$, attached to the support and projecting into a groove in the rack-bar. The paper-carriage receives motion from the detent $i$ through the pinion $r''$ in the following manner: Upon the side of the detent is secured a spring $u$, which, when the detent rises, engages with a tooth of the pinion $r''$, and when the detent descends causes the pinion to turn one tooth and the rack-bar J and paper-carriage to advance the requisite space occupied by a single letter in the line of printing. The spring $u$ bends outward or away from the detent when the latter rises, as indicated by the dotted lines in Fig. 14, and its lower end engages with the next upper tooth of the pinion $r''$, so that when the detent descends the spring $u$ forces the pinion to turn the width of one tooth. The lower end of the spring also acts as a stop to prevent the pinion and paper-carriage from moving too far. Being interposed between the detent and the pinion, it arrests the movement of the latter. The spring $p''$, attached to the bar K and engaging with the teeth of the pinion, prevents any reverse movement or recoil of the pinion. I have found it advantageous to employ, also, the pivoted dog R, which is connected with the detent at $w'$ and oscillates, when the detent moves, about the pivot $v'$, so as to engage and disengage its teeth $z'$ with the teeth of the pinion. The end $w'$ of the dog R is fitted to a slot or opening in the detent, so that when the detent rises the teeth $z'$ of the dog are disengaged from the pinion; but when the detent descends at the lower part of its movement the teeth are again engaged with those of the pinion to insure entire accuracy in the spacing. The pivot $v'$ is inserted in the bar K, which is slotted to permit the motion of the dog. The detent receives its downward movement, which also through the connecting mechanism restores the tappet $g'$ to its normal position, from the ring of inclined faces or cams $h'''$, which is attached to the lower side of the type-wheel. The cams $h'''$ act on the detent, after the completion of the printing operation, either directly or through the medium of the pivoted bar S, which relieves the friction of the parts. The bar S is pivoted to any convenient part of the frame, or to the bar K or a lug thereon, its free end extending inward to a position where it interposes between the cams $h'''$ and the detent $i$.

In order to permit the return movement of the paper-carriage at the ends of the lines, I arrange the pinion $r''$ so that it can slide on its stud $x$, so as to disengage its teeth from those of the rack J, as indicated by the full and dotted lines in Fig. 15. The pinion is drawn out of mesh with the rack by the rod X, which extends under the machine and terminates with a suitable handle Y. Its inner end carries a hook or offset which engages with a groove $t''$ in the hub of the pinion $r''$. A spring Z, Fig. 10, may be employed to hold the pinion $r''$ in mesh with the rack J. A guide $v''$, Fig. 10, is provided for the rod X. The teeth of the rack J are cut away at $u''$, Fig. 13, so as to stop the feeding of the paper-carriage when the latter arrives at the end of a line. As indicated in Fig. 10, the bar K has an inward extension which supports the inner end of the stud $x$ of the pinion $r''$ and which also serves to attach the bar to the lower part of the framework of the machine. A clip $z'''$, Fig. 10, holds the detent $i$ in the groove in the extension of the bar E or the lower plate of the machine.

It will be observed that the type are placed at or near the upper margin of the type-wheel and the type-revolving devices below the type for the purpose of permitting the operator to read the printing in full view as fast as it proceeds. The top plate G of the machine is shortened on its rear edge, so as not to interfere with the visibility of the printing, and in order to secure room for the type-revolving devices the paper carriage or support is constructed so that the paper is bent outward from the lower part of the revolving wheel. It is obvious that the shaft E of the wheel A may be inclined in either direction and the advantages of printing in plain sight of the operator retained. The type-wheel may be arranged to revolve at any angle with the horizontal plane in either direction, which will not interfere with the visibility of the printing. In order to keep the paper in contact with the platen, I arrange a guard or spring U, Figs. 1, 10, and 13, on the right-hand side of the machine, which bears on the paper at a suitable point above and to the right of the place where the printing is done. By placing it on the right-hand side of the machine I avoid interfering with the visibility of the line which is being printed, the rest of the printing being above the guard. The guard may be attached to the frame of the machine in any suitable manner, so that it may be readily removed or detached, if desired. In the construction shown it is fitted to a pin $y$, Fig. 1, so that it may be lifted off therefrom, a stop $z$ being employed to prevent its turning on the pin. $s''$ is an adjustable stem, to which the guard is attached and which is adjustably secured to the boss V fitting the pin $y$. Any other suitable means of sustaining the guard U may, however, be employed. While I have shown and described the machine as provided with printing-characters, it is obvious that any impression-face desired can be placed upon the type or impression device carriers without departing from the spirit of my invention.

I claim—

1. A wheel arranged to be continuously revolved, in combination with a series of type or impression devices individually mounted thereon to turn in the plane of the revolution of said wheel, the construction being such that the wheel carries a type or impression device to the impression-point, and the said type or impression device is permitted to turn on its own axis in making the impression.

2. The combination of a wheel, arranged to be continuously revolved; a series of individual type or impression devices independently movable on said wheel, so that they may turn on their own axes while being carried bodily around the axis of the wheel; a stationary platen; and a stop acting to momentarily hold the face of the required type or impression device at rest opposite the platen.

3. A platen; an adjacent wheel arranged to be continuously revolved; a series of type or impression devices pivoted to said wheel, so that while being carried thereby past the platen, they may be turned on their own axes to present their faces toward or away from the platen; a stop to turn the required type or impression device to the impressing position; and springs to return them to their normal position.

4. In combination with a stationary platen; an adjacent wheel, arranged to be continuously revolved; a series of type or impression devices individually pivoted to said wheel and independently movable thereon; and means, substantially as described, for turning the required type or impression devices to present their faces toward the platen, and for holding said faces against lateral motion during the impression, whereby the type or impression device is caused to work with a rolling action and without changing its position on the material.

5. In combination with a platen or work-support, a wheel or carrier arranged to be continuously revolved; individual impression devices independently pivoted to said wheel near its periphery and having a rolling action in imparting the impression; and means for turning the required type or impression devices on their own axes as they approach the platen in such manner that their faces cease their lateral movement and remain momentarily in a fixed position on the work.

6. In combination with a platen or work-support, a revoluble wheel; a series of individual type or impression devices so pivoted to said wheel that their faces may be turned to or from the platen in passing the same and have a rolling action thereon; a series of finger-keys; a stop to turn the desired type or impression device to the working position; and intermediate connections, through which the finger-keys act, to control the stop, and thereby cause the desired impression.

7. The wheel arranged to be continuously revolved; type or impression devices individually pivoted thereto and having a rolling action in imparting the impression; a series of finger-keys, and intermediate connections through which the type or impression devices are caused to turn on their own axes to working position; a work-carriage; and an automatic feed mechanism by which the work is advanced between the impressing actions.

8. In combination with a wheel, and type or impression devices pivoted thereto; a work-carriage, its feed devices; and a detent or trip, serving the double purpose of turning the type or impression device to working position, and of actuating the feed devices.

9. In combination with a wheel provided with type or impression devices and with inclined faces; a stop or detent adapted to engage and turn the impression devices, and to encounter the inclined faces.

10. The wheel, arranged to be continuously revolved, a platen, type or impression devices individually pivoted thereto and having a rolling action on the platen; and a finger-key mechanism for bringing said type or impression devices successively into action; in combination with inking mechanism to act upon the moving type or impression devices, and a work-feeding mechanism acting on the work in advance of the impression device, whereby contact of the feed mechanism with the freshly-impressed surface is avoided.

11. A wheel, arranged to be revolved, and a series of type or impression devices pivoted thereto; in combination with a stop to hold said type or impression devices momentarily with their active faces at the impression-point, said faces and the stop being equidistant from the axes of the impression devices, whereby an impression device is prevented from shifting laterally on the work during the act of impression.

12. In combination with a wheel, type or impression devices, each consisting of a rotary shaft provided with a trip-arm and with a second arm bearing a character; and a dog or trip adapted to the trip-arms, whereby the type or impression devices advancing bodily with the wheel may be turned on their axes to the proper working position.

13. A wheel, a series of type or impression devices pivoted thereto, so that each may be turned independently to an active or inactive position; a platen adjustable to and from the wheel past which the impression devices are all carried by the wheel; a trip device, to turn the designated type or impression device to working position as it approaches the platen; and means for throwing the trip out of its operative position after its action on each impression device, whereby the trip is prevented from causing the action of a second impression device.

14. A wheel arranged to be continuously revolved; a series of type or impression devices pivoted thereto; an adjacent platen or work-support; and means for turning the designated impression devices momentarily on their own axes in the reverse direction from that in which the wheel revolves to force the impression device toward the platen while retaining a fixed position on the work.

15. In combination with a wheel, type or impression devices pivoted thereto, their returning-springs; a trip to turn the impression device to working position; a keyboard; slides actuated by the respective keys; and trip-operating devices actuated by the slides.

16. In combination with a wheel and type or impression devices pivoted thereto; an external trip; trip-operating devices extending through the wheel and revoluble therewith; a keyboard and finger-key slides adapted to encounter and actuate the trip-operating devices.

17. In combination with a revoluble wheel and its pivoted impression devices; an adjacent platen; and adjusting devices to move said platen to and from the axis of the wheel.

18. In combination with a revoluble wheel and type or impression devices pivoted thereto; an adjustable platen; and a stop to limit the inward movement of the platen.

19. In combination with a revoluble wheel, pivoted type or impression devices; and adjustable supports connecting said devices with the wheel, and allowing their adjustment to and from its axis.

20. In combination with a rotary wheel and pivoted type or impression devices, each having an impression-arm and a trip-arm, work-feeding rolls located between the two arms.

21. A horizontally-revoluble wheel, and horizontally-turning type or impression devices pivoted thereto, and having a rolling action in imparting their impression, in combination with a work-carriage arranged to feed the work upward past the periphery of the wheel, whereby the entire impressed surface is constantly exposed to view.

22. The combination with a wheel, of a platen; and type or impression devices pivoted to the wheel, and having their impression-faces curved to afford a rolling contact.

23. The combination with a wheel arranged to be continuously revolved, having type or impression devices with curved impression-faces pivoted thereto so as to swing outward in the plane of revolution; of a platen having a curved face the construction being such that a rolling contact is effected between said impression device and platen.

24. The combination with a wheel having type or impression devices pivoted thereto on axes parallel to the axis of the wheel, of an elastic or yielding platen.

25. The combination with a wheel, of type or impression devices pivoted thereto, and provided with actuating-arms; and a detent interposed in the path of the arms, and having its active face curved to secure the proper action of the type or impression devices.

26. The combination with a wheel arranged to revolve continuously on a vertical axis, and having individual type or impression devices pivoted thereto; of a suitable framework supporting the wheel; a work-carriage arranged to travel backward and forward in rear of the wheel; a keyboard, and suitable connecting mechanism for operating the type or impression devices; and a platen arranged behind the work, and connected with the framework by a support which permits the movement of the work-carriage.

27. The combination with a wheel, of a type or impression device; a rotary shaft from which the same projects, and an actuating-arm also carried by said shaft.

28. The combination with a wheel, of bars fitted thereto and a rotary shaft or stem having bearings in the bars, and carrying a type or impression device and an arm.

29. The combination with a wheel having a series of type or impression devices pivoted thereto; of a detent arranged to operate the type or impression devices; a series of finger-keys; suitable connecting mechanism for operating the detent from the keys; and a locking bar or plate which prevents the striking of the keys during a portion of the revolution of the wheel.

30. The combination with a wheel, of type or impression devices, each provided with an arm; a detent; a lever; a rod; a suitable finger-key, and mechanism for operating the rod therefrom.

31. A wheel or carrier, a series of finger-keys through which the impression of the respective characters is secured; and automatic mechanism by which certain of the keys are locked out of action during a portion of each revolution, whereby the machine is compelled to print or impress in proper sequence the characters represented by the controlled keys.

32. In combination with a wheel, its pivoted type or impression devices; a series of finger-keys, and devices set for action by the keys to cause the impression of respective characters; a rotating arm to restore said devices to their normal positions at each revolution; and automatic mechanism acting, during a portion of each revolution, on a portion of the keys to prevent their action when either of them has been acted upon by the restoring-arm, whereby it is rendered impossible to operate the controlled keys in such manner as to cause the impression of their characters in improper sequence.

33. The combination of a rotary wheel provided with pivoted type or impression devices, having a rolling action in imparting their impression; of a carriage presenting the work to the periphery of the wheel, and a shield or guard lying between the wheel and the path of the work.

34. In combination with a wheel, type or impression devices pivoted thereto, and each having a shaft provided with a trip-arm; of a platen; and a work-support which holds the work away from the periphery of the wheel opposite the tripping mechanism.

35. The combination with a wheel arranged to be continuously revolved, provided with pivoted type or impression devices having a rolling action in imparting their impression, a series of finger-keys and suitable connecting mechanism for operating the said impression devices; a stationary platen; a traveling work-carriage consisting of two or more spring-pressed rollers; and suitable work-carriage-feeding mechanism.

36. The combination, in the traveling work-carriage, of a roller; spring-pressed rollers and gears connecting said rollers.

37. The combination, in a traveling work-carriage, of the three rollers and the guard.

38. The combination with a wheel or disk arranged to be revolved continuously in a horizontal plane, and provided at or near its upper edge with pivoted type or impression devices, arranged to revolve outward in the plane of revolution to perform their work; of suitable mechanism for revolving said impression devices, located below the same, whereby the visibility of the impression is secured.

39. The combination with a wheel or disk arranged to be revolved continuously in a horizontal or nearly horizontal plane, and provided near its upper edge with pivoted type or impression devices arranged to turn outward in the plane of revolution to perform their work; of suitable mechanism located below the type or impression devices and serving to turn the same; and a traveling work carriage or support which holds the work away from the means for turning the type or impression devices.

40. The combination with a wheel provided with individually-pivoted type or impression devices arranged to swing outward in the plane of revolution against a stationary platen, to perform their work and to have a rolling action on said platen; of means located and adapted to hold the work in contact with the platen.

41. The combination with means for supporting the work; of a type or impression device supported to turn upon two axes, a returning-spring for said device; a trip to turn the said device to working position; a keyboard; slides actuated by the respective keys; and trip-operating devices actuated by the slides.

42. In a machine of the class described, the combination of a revoluble disk or wheel; a series of type or impression devices pivoted on the periphery thereof and having a rolling action in imparting the impression; a stop normally withdrawn from the plane of movement of said devices; a series of keys; means controlled by a key, when the latter is depressed, for projecting the stop; and a device actuated by the wheel for withdrawing the stop.

43. In a machine of the class described, the combination of a movable body carrying a series of pivoted type or impression devices; a series of keys marked with characters corresponding to such devices; a movable stop normally withdrawn from the plane of motion of said devices; means controlled by a key for projecting said stop; a device for withdrawing the stop; a work holder and feeder; and means actuated by the stop for imparting a step-by-step movement to the same.

44. In a machine of the class described, the combination with a movable body carrying a series of type or impression devices; of a series of keys; a series of slides connected to be depressed by the keys; means carried by the movable body, and adapted to be actuated by any one of said devices when depressed; a stop for throwing the impression device selected into operative position; and means for actuating said stop.

45. In combination with a movable body carrying a series of pivoted type or impression devices having a rolling action normally withdrawn from operative position; a series of keys; means actuated by the keys to be thrown into the plane of movement of said body; a stop for turning the type or impression device selected; devices for moving the stop into operative position and means for withdrawing the stop.

46. In a machine of the class described, the combination with a revoluble disk or wheel; a series of type or impression devices individually pivoted in the periphery thereof; and means for yieldingly holding said devices normally out of operative position; of a stop; mechanism for projecting said stop into the plane of revolution of the impression devices; and means actuated by the wheel for withdrawing the stop.

47. In a machine of the class described, the combination of a rotatable body; a series of type or impression devices pivoted thereto; a series of keys; a type or impression device actuator controlled by the keys for throwing the impression device selected into operative position; a spacing device controlled by the actuator; and means for returning the keys to their normal positions.

48. In a machine of the class described, the combination with a revoluble body having a series of type or impression devices journaled in the periphery thereof; of a series of keys; an impression-device actuator controlled by the keys, and operating to throw the impression device selected into operative position; and means carried by the revoluble body for moving such actuator out of action.

49. In a machine of the class described, the combination with a movable body carrying a series of type or impression devices normally held out of operative position; of a series of keys, a series of devices actuated by the keys; a stop for throwing the impression device selected into action; a stop-actuator carried by the movable body; and a device connecting such actuator with the stop.

50. In a machine of the class described, the combination with a movable body carrying type or impression devices normally held out of operative position; of a series of slides adapted to be depressed by the keys; mechanism adapted to be operated by any one of such slides when depressed by the key selected; and a stop for throwing the type or impression device corresponding to such key, into operative position.

51. In a machine of the class specified, the combination with a movable body; of a series of type or impression devices pivoted thereon; means for moving an impression device into operative position; a device mounted in and carried by the body for actuating such means; a series of keys; devices controlled by said keys, when depressed, for actuating the type or impression device moving means; and means actuated by the movable body for returning the keys and the said devices to their normal positions.

52. The combination with a movable body carrying individual type or impression devices normally withdrawn from operative position, of an actuator for causing the impression device to have a rolling or rocking action while imparting its impression.

53. The combination with a carrier, of an individual type or impression device supported thereon; and having a rolling action on said carrier while imparting its impression.

54. The combination with type or impression devices, individually supported upon two relatively remote axes, and normally adapted to have a continuous rotative movement about one axis, and an intermittent rotative movement about the other axis; of a platen located beyond the path of the type or impression device; means for normally holding the impression device out of its working position; and means located with relation to the said platen to engage and rotate the impression device on its own axis at that corresponding point in its orbital movement which brings said impression device into rolling contact with the platen.

55. The combination with a movable body, of type or impression devices pivotally supported thereon; means for normally holding the impression devices against rotation and in an inoperative position; and means for engaging an impression device during the rotation of the body, and which, on engaging the impression device rotates it in a direction opposite to the direction of the movement of the body.

56. The combination with a suitable platen, of a movable body constituting one toggle-arm; and a type or impression device connected to said body and constituting another toggle-arm, a platen and means for causing the type or impression device to have a rolling action on such platen.

57. The combination with a movable body and a series of individual type or impression devices mounted thereon to have a rolling or rocking action in making the impression; of means whereby any type or impression device is selectable at will and made to impart its impression.

58. The combination with a movable body and a series of individual type or impression devices mounted thereon to have a rolling or rocking action in making the impression of a platen and means whereby any type or impression device is selectable at will and made to impart its impression.

59. The combination with a movable body and a series of individual type or impression devices mounted thereon, to have a rolling or rocking action, of a platen, a work-feeder, and means whereby any one of said impression devices is selectable at will and made to impart its impression.

GEO. B. SELDEN.

Witnesses:
A. SORGE, Jr.,
H. G. PHILLIPS.